(12) United States Patent
Wolfe

(10) Patent No.: US 7,777,480 B2
(45) Date of Patent: Aug. 17, 2010

(54) ANTENNA ORIENTATION SENSOR

(75) Inventor: Michael Wolfe, Garland, TX (US)

(73) Assignee: Andrew LLC

( * ) Notice: Subject to any disclaimer, the term of this patent is extended or adjusted under 35 U.S.C. 154(b) by 307 days.

(21) Appl. No.: 11/852,288

(22) Filed: Sep. 8, 2007

(65) Prior Publication Data

US 2009/0066323 A1 Mar. 12, 2009

(51) Int. Cl.
*G01R 35/00* (2006.01)
*H01Q 3/00* (2006.01)

(52) U.S. Cl. .......................... 324/202; 342/359

(58) Field of Classification Search ............... 324/202, 324/247, 260, 261; 33/356, 357; 73/1.75, 73/1.76; 342/359
See application file for complete search history.

(56) References Cited

U.S. PATENT DOCUMENTS

| | | | |
|---|---|---|---|
| 3,991,361 A | 11/1976 | Mattern et al. | |
| 4,604,521 A * | 8/1986 | Takekoshi et al. | 250/231.18 |
| 4,734,863 A | 3/1988 | Honey | |
| 5,349,856 A | 9/1994 | Nakamura | |
| 5,351,060 A | 9/1994 | Bayne | |
| 5,363,700 A | 11/1994 | Joly et al. | |
| 5,485,169 A | 1/1996 | Kitabatake et al. | |
| 5,517,204 A | 5/1996 | Murakoshi et al. | |
| 5,557,285 A | 9/1996 | Bender et al. | |
| 5,790,075 A * | 8/1998 | Inugai et al. | 342/359 |
| 5,948,044 A * | 9/1999 | Varley et al. | 701/220 |
| 6,140,933 A * | 10/2000 | Bugno et al. | 340/693.5 |
| 6,195,559 B1 * | 2/2001 | Rapeli et al. | 455/500 |
| 6,459,990 B1 | 10/2002 | McCall et al. | |
| 6,842,153 B2 | 1/2005 | Challoner | |
| 7,322,117 B2 * | 1/2008 | Olson et al. | 33/356 |
| 2008/0180337 A1 * | 7/2008 | Hauff | 343/760 |

FOREIGN PATENT DOCUMENTS

| | | |
|---|---|---|
| DE | 3019743 | 12/1981 |
| EP | 0715150 | 6/1996 |
| GB | 2053471 | 2/1981 |

OTHER PUBLICATIONS

Angrabeit, Frank; International Search Report, Counterpart International Patent Application Serial No. PCT/US2008/074183; issued Feb. 27, 2009.
Product Brochure: Sunsight Instruments, LLC. Downloaded from http://www.sunsight.com/About.aspx on Sep. 6, 2007. Brief description of "AntennaAware Sensor" on p. 2.

* cited by examiner

*Primary Examiner*—Kenneth J Whittington
(74) *Attorney, Agent, or Firm*—Babcock IP, PLLC

(57) ABSTRACT

An antenna orientation sensor, having a base, a pivoting support coupled to the base. An actuator operable to move the pivoting support through a calibration movement with respect to the base. A magnetic sensor on the pivoting support and a position sensor operable to sense the position of the pivoting support within the calibration movement.

12 Claims, 4 Drawing Sheets

ANTENNA ORIENTATION SENSOR

BACKGROUND

1. Field of the Invention

The invention relates to an antenna orientation sensor. More particularly the invention relates to a magnetic antenna orientation sensor, capable of self-correction for the presence of hard and soft iron effects.

2. Description of Related Art

To optimize electrical performance, directional antennas are oriented to direct the antenna radiation pattern towards a desired direction. Orientation of an antenna is typically performed via adjustments to the antenna mount, with respect to a fixed mounting point, to vary orientation in, for example, three axis: proper heading, roll and pitch (mechanical beam tilt).

Orientation may generally be performed by manual or remote controlled electro-mechanical adjustment with respect to a reference direction. Orientation may be performed upon installations that are fixed, or dynamically on an ongoing basis during antenna operation to satisfy varying directional requirements and or changes to the orientation of the antenna mount, for example where the communication target(s) are mobile and or the antenna is mounted upon a movable land, air or water vehicle. Magnetic direction sensors typically provide a directional output with respect to the planetary magnetic north pole. A problem with magnetic direction sensors is errors introduced by hard and soft iron effects from nearby metal, such as the mounting of the antenna upon, for example, a metal tower or vehicle. The error level introduced will vary with the location and size of the nearby metal at each installation. Further, the error magnitude may change as the selected antenna orientation varies the location and or orientation of the sensor towards and away from the nearby metal.

Sunlight angle sensors have been applied as an alternative to magnetic direction sensing, however these systems operate only when and where the sun is visible to the sensor and may have a significant initial reading lag time. Also, sunlight angle sensors require periodic cleaning to prevent failure of the sensor due to environmental fouling, a significant drawback where the sensor is difficult and or dangerous to access, such as when mounted atop an antenna tower.

Therefore, it is an object of the invention to provide an apparatus that overcomes deficiencies in the prior art.

BRIEF DESCRIPTION OF THE DRAWINGS

The accompanying drawings, which are incorporated in and constitute a part of this specification, illustrate embodiments of the invention and, together with the general and detailed descriptions of the invention appearing herein, serve to explain the principles of the invention.

DETAILED DESCRIPTION

The inventor has recognized that, by monitoring sensor outputs along a repeatable calibration movement of the antenna orientation sensor, the hard and soft effects of nearby ferrous material may be calculated to determine a true magnetic field reference direction, thereby eliminating the hard and soft effects.

Figure 1:
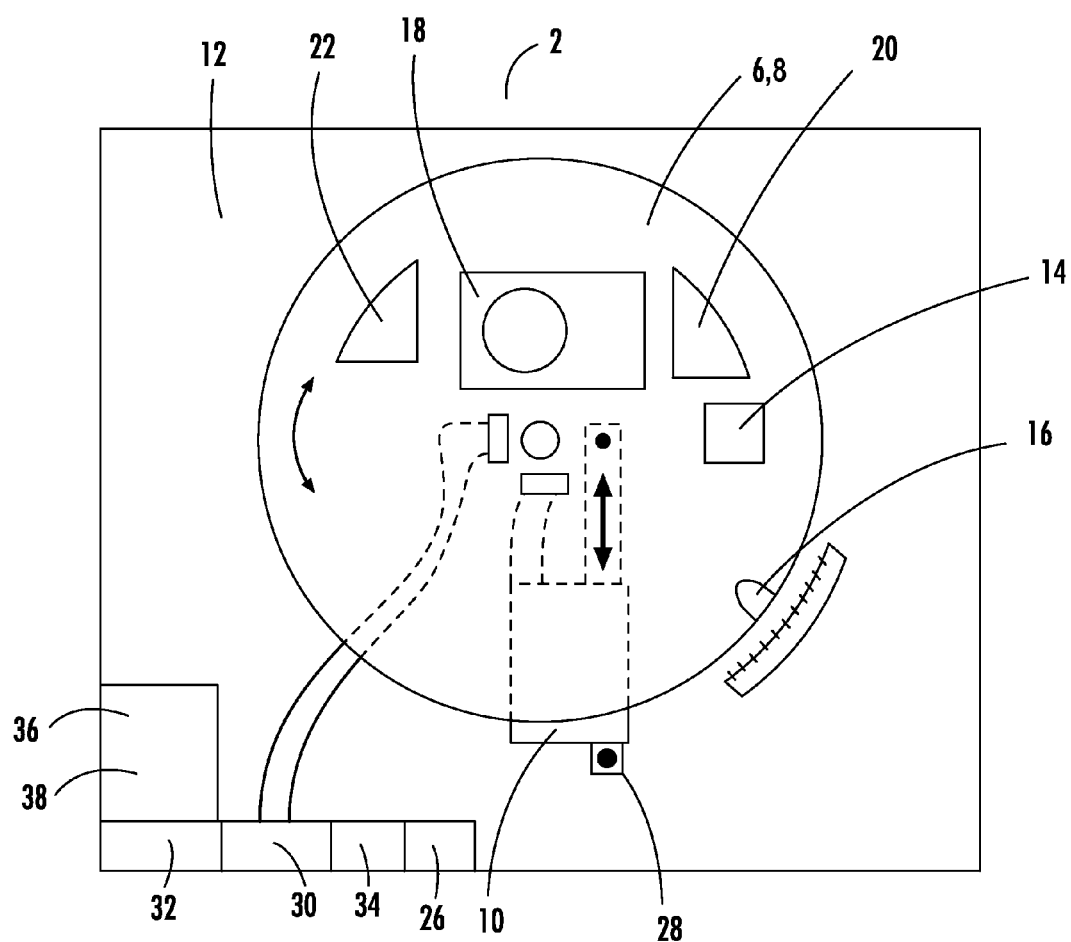
FIG. 1 is top schematic view of an exemplary antenna orientation sensor module.

An exemplary embodiment of a magnetic sensor based antenna orientation sensor in module form is shown in FIG. 1. In an antenna orientation sensor module 2 according to the invention, rather than moving the entire module 2, and whatever the module 2 is mounted upon through the calibration movement, the magnetic sensor 4 is movable through the calibration movement with respect to the module 2. The magnetic sensor 4 may be mounted upon, for example, a pivoting support 6 such as a printed circuit board (PCB) 8 movable through a calibration movement such as an arc segment via an actuator 10 coupled to a base 12 of the module 2. In addition to the magnetic sensor 4, the pivoting support 6 may also carry an accelerometer 14 and or other position reporting sensor(s) 16 to identify the position of the magnetic sensor 4 as it is moved through the calibration movement. To obtain three axis position data, the magnetic sensor 4 may be a three axis magnetic sensor. The position reporting sensor 16 may be, for example, an optical sensor with respect to the base, tilt sensor, a two axis accelerometer, or a translation of the reported actuator position based upon the secondary position reporting sensor 28, described herein below.

Associated signal integration circuitry 18, Global Positioning Service (GPS) circuitry 20 and or direction output calculation circuitry 22 may be located on a single PCB 8 along with the magnetic sensor 4 and a position reporting sensor 16 or may alternatively be provided on a separate PCB board (not shown).

Figure 2:
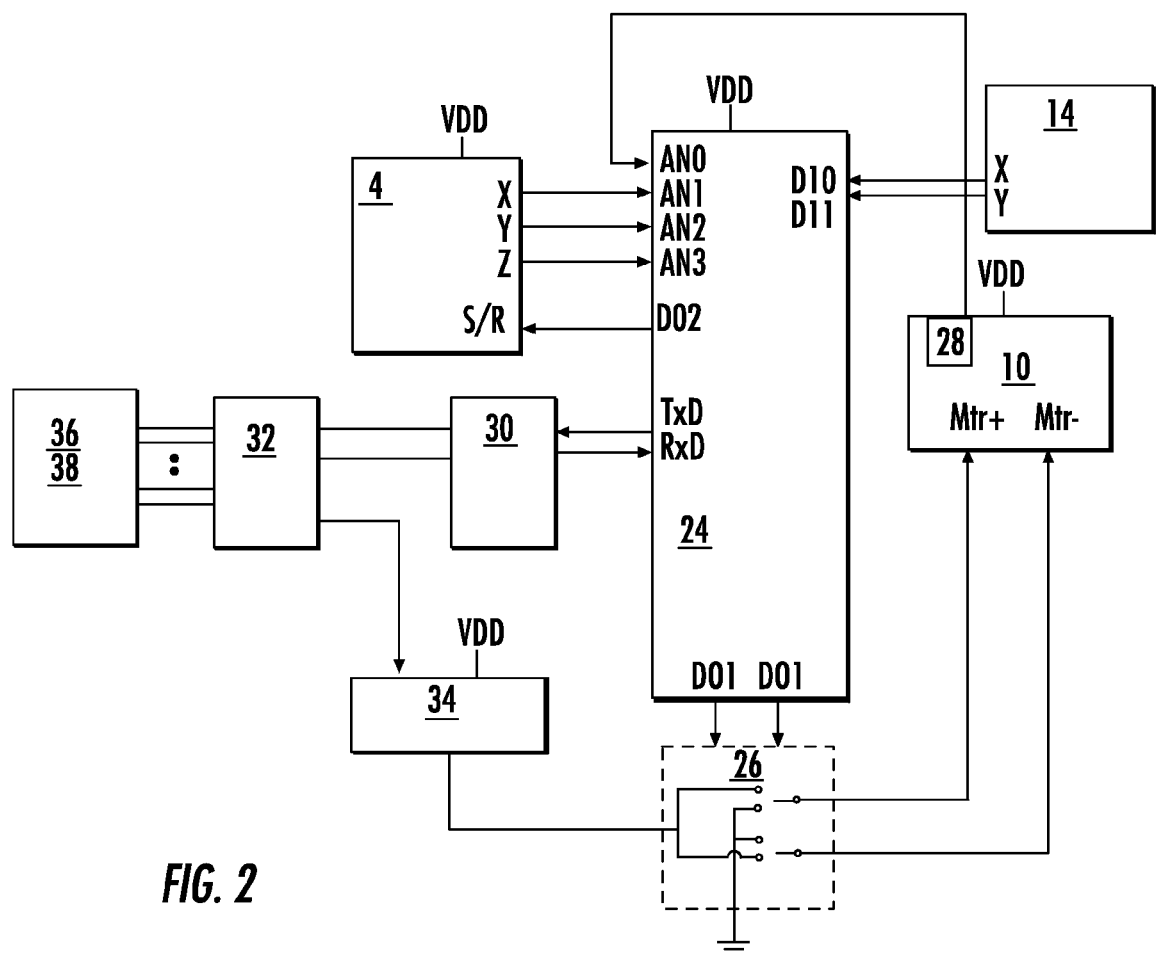
FIG. 2 is a block circuit diagram demonstrating functional interconnections of antenna orientation sensor electrical circuit elements.

An example block diagram of signal integration circuitry 18 is shown in FIG. 2. The three axis magnetic sensor 4 delivers, for example, X, Y and Z axis analog AN1-AN3 or digital inputs to a microcontroller 24, the output of the three axis magnetic sensor 4 callable by a link between a set/reset input of the three axis magnetic sensor 4 driven from the microcontroller 24 via a digital output DO2. The position reporting sensor 16, in this example a two-axis accelerometer 14, similarly delivers X and Y digital D10 and D11 or analog outputs to the microcontroller 24. Digital outputs D01 are applied to a relay or other control 26 that energizes the actuator 10. A secondary position reporting sensor 28 of the actuator 10 may be applied as a position output of the linear actuator 10 that drives an analog AN0 or digital input of the microcontroller 24 to report, for example, the current angle of the calibration movement. For example, serial data, communication control inputs and data outputs between the microcontroller 24 and a transceiver 30 are transmitted/received at the microcontroller 24 TxD and RxD ports. The module 2 also may include lightning protection 32 for the electrical circuits and a local power supply 34. Communications and power are delivered to the module via a network interface 36 and or bus interface 38.

Figure 3:
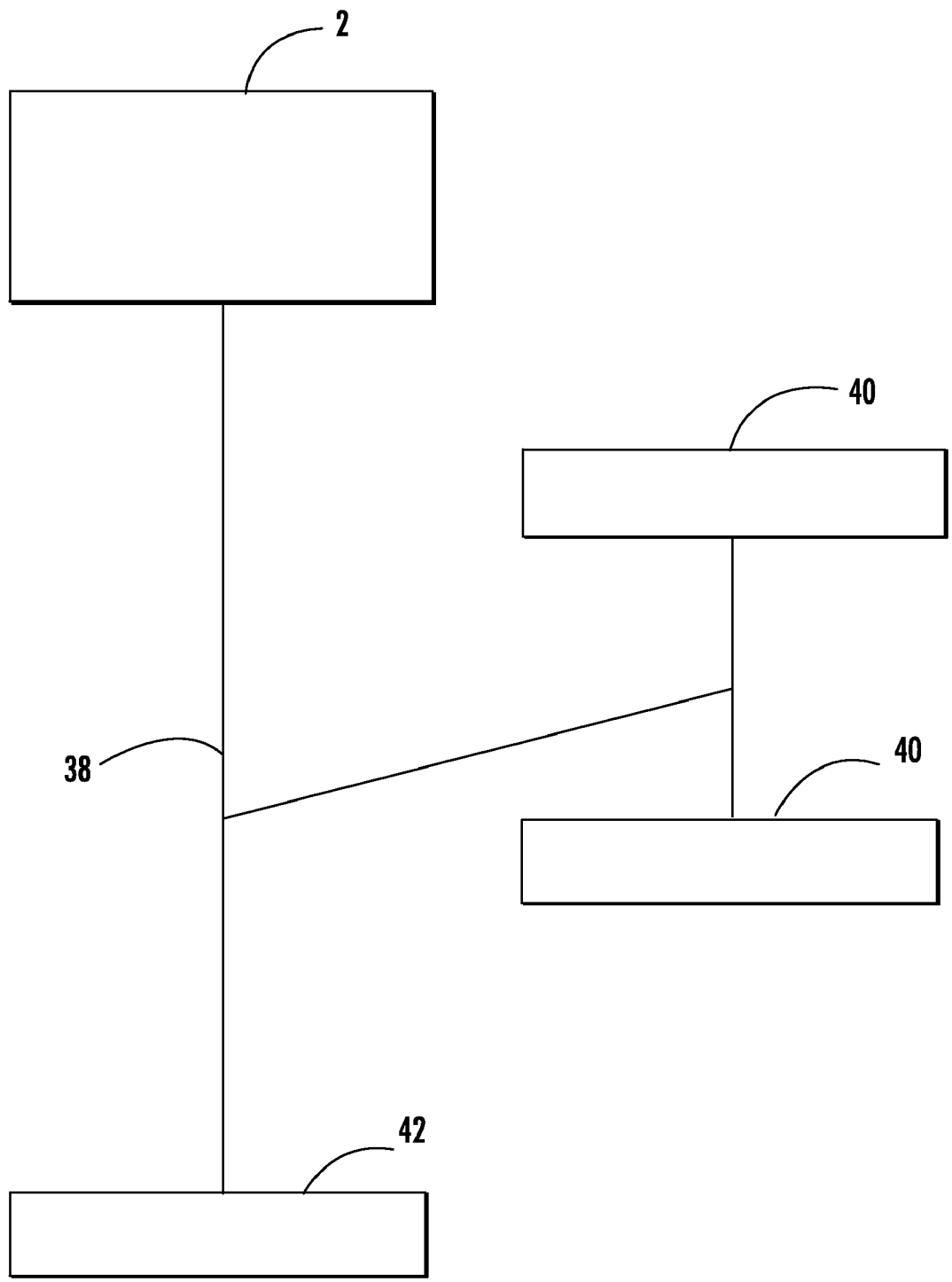
FIG. 3 is a network diagram for a distributed network embodiment of the invention.

The module 2 may be configured for local feedback and control or control over an extended data network 38, as shown for example in FIG. 3, comprising links to a plurality of devices such as communications transceivers/antennas that are mounted local to the module 2 and oriented via the feedback from the module 2 by a remote controller 42.

The calibration movement is performed with respect to pitch angle α and roll angle β readings obtained from the position reporting sensor 28 and a reference angle representing the position of the magnetic sensor 4 along the arc of the calibration movement. The magnetic sensor 4 outputs are designated as x, y, and z, with x aligned with the boresight of the antenna or other designated reference orientation, y forming with x the azimuth plane of the antenna and x and z forming the elevation plane. The x and y sensor outputs are normalized between reference coordinates of the module 2 shown in frame 1, below, and a reference frame aligned with the local horizontal plane shown in frame 3, below.

$$\begin{bmatrix} x_1 \\ y_1 \\ z_1 \end{bmatrix} = \text{Initial\_sensor\_outputs}$$

$$\begin{bmatrix} x_2 \\ y_2 \\ z_2 \end{bmatrix} = \begin{bmatrix} x_1\cos(\alpha) + z_1\sin(\alpha) \\ y_1 \\ -x_1\sin(\alpha) + z_1\cos(\alpha) \end{bmatrix} \text{Rotation about } y \text{ to correct for pitch}$$

$$\begin{bmatrix} x_3 \\ y_3 \\ z_3 \end{bmatrix} = \begin{bmatrix} x_2 \\ -z_2\sin(\beta) + y_2\cos(\alpha) \\ z_2\cos(\beta) + y_2\sin(\beta) \end{bmatrix} \text{Rotation about } x \text{ to correct for roll}$$

The outputs $x_3$ and $y_3$ represent x- and y-axis sensor data that have been corrected for the pitch and roll angles of the antenna to obtain horizontal plane equivalent magnetic field measurements.

An exemplary method for the error analysis and application of the resulting correction factors is to generate a corrected three axis orientation output based upon deviations from:

$$(x_i - a)^2 + (y_i - b)^2 = r^2$$

This is the equation for a circle with origin a, b and radius r, which would be the sensor ideal behavior along the calibration movement, that is without the presence of hard or soft iron effects. Data points $x_i$, $y_i$ are extracted from sensor readings that are converted to the local horizontal plane. To analyze deviation from this ideal, a Least Squares error function is applied:

$$E(a, b, r) = \sum_1^N ((x_i - a)^2 + (y_i - b)^2 - r^2)^2 \rightarrow \text{minimize}$$

$$= \sum_1^N (x_i^2 - 2ax_i + a^2 + y_i^2 - 2by_i + b^2 - r^2)^2$$

Let $k = a^2 + b^2 - r^2$ $$H(a, b, k) = \sum_1^N (x_i^2 - 2ax_i + y_i^2 - 2by_i + k)^2 \rightarrow \text{minimize}$$

(into an equation that is quadratic in a, b, and k)

Let $R_i^2 = x_i^2 + y_i^2$ $$H(a, b, k) = \sum_1^N (R_i^2 - 2ax_i - 2by_i + k)^2$$

$$= \sum_1^N (R_i^4 - 4ax_i R_i^2 - 4by_i R_i^2 + 4a^2 x_i^2 + 4b^2 y_i^2 + 8abx_i y_i - 4ax_i k - 4by_i k + 2R_i^2 k + k^2)$$

Take partial derivatives with respect to a, b, and k and use to find a, b, and k values that minimize H:

$$\frac{\delta H}{\delta a} = \sum_1^N (-4x_i R_i^2 + 8ax_i^2 + 8bx_i y_i - 4x_i k) = 0$$

$$\frac{\delta H}{\delta b} = \sum_1^N (-4y_i R_i^2 + 8by_i^2 + 8ax_i y_i - 4y_i k) = 0$$

$$\frac{\delta H}{\delta k} = \sum_1^N (-4ax_i - 4by_i + 2R_i^2 + 2k) = 0$$

This results in a set of linear equations to solve:

$$\begin{bmatrix} a \\ b \\ k \end{bmatrix} = \begin{bmatrix} \sum_1^N 8x_i^2 & \sum_1^N 8x_i y_i & \sum_1^N (-4x_i) \\ \sum_1^N 8x_i y_i & \sum_1^N 8y_i^2 & \sum_1^N (-4y_i) \\ \sum_1^N (-4x_i) & \sum_1^N (-4y_i) & 2N \end{bmatrix}^{-1} \begin{bmatrix} \sum_1^N 4x_i R_i^2 \\ \sum_1^N 4y_i R_i^2 \\ \sum_1^N (-2R_i^2) \end{bmatrix}$$

$$r = \sqrt{a^2 + b^2 - k}$$

The calibration data aggregation, orientation and planar normalization calculations may take place in the microcontroller 24, or in the remote controller 42 as desired. For example, where a plurality of antenna orientation sensor module(s) 2 are coupled to an array of antennas, each under independent orientation control, it is cost effective to configure the system to handle calculations at the remote controller 42, rather than providing numerous higher level microcontrollers 24, one in each antenna orientation sensor module 2.

To further improve precision of the module 2, a further correction between the geographic north and the magnetic north may be applied by providing the module with latitude and longitude data that is either operator entered, for example at a static installation, or dynamically obtained from a, for example, GPS unit with a latitude and longitude output coupled to the microcontroller 24 or remote controller 42.

Figure 4:
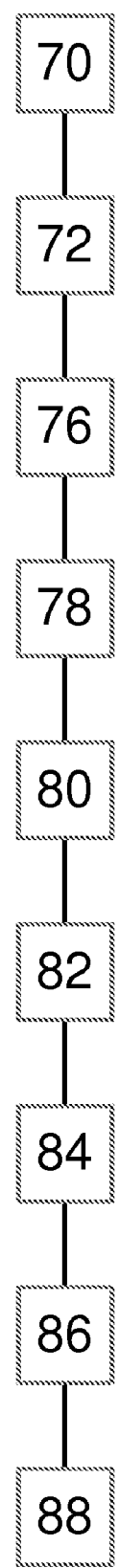
FIG. 4 is an exemplary operation sequence for the antenna orientation sensor module.

An exemplary operation sequence for the module as applied to antenna orientation is shown in FIG. 4. At 70, the sequence is initiated, for example by an operator and or as a precursor to a re-alignment command to the antenna position controls. At 72, the module 2 reads pitch and roll angles from the position reporting sensor 16. At 76, magnetic sensor data with respect to rotation angle through the calibration movement range is collected. At 78, any hard and soft effects are removed from the magnetic sensor data via the least squares error function. At 80, the corrected magnetic sensor data is normalized with respect to the pitch and roll angles from the position reporting sensor. At 82, the magnetic heading of the antenna is stored, that is with respect to the module orientation as it is mounted upon the antenna. At 84, site longitude and latitude data is referenced either from the operator entered data storage location or dynamically from an associated GPS circuitry 20 and or separate GPS module. At 86, the magnetic heading is adjusted according to the longitude and latitude data with respect to true north versus magnetic north. At 88, the resulting heading, with respect to true north, pitch and roll data is stored, for example with a time/date stamp to provide a history of the antenna orientation and or a reference position for further antenna orientation adjustments.

One skilled in the art will appreciate that the magnetic sensor module 2 may be formed as a compact, cost effective and easily environmentally sealed module. Thereby, highly accurate, maintenance free position feedback may be applied to positioning systems in close proximity to metal structure that would otherwise introduce unacceptable and or variable hard and soft iron effects to common magnetic sensors.

| Table of Parts | |
|---|---|
| 2 | module |
| 4 | magnetic sensor |
| 6 | pivoting support |
| 8 | printed circuit board |
| 10 | actuator |
| 12 | base |
| 14 | accelerometer |
| 16 | position reporting sensor |
| 18 | signal integration circuitry |
| 20 | global positioning service circuitry |
| 22 | direction output calculation circuitry |
| 24 | microcontroller |
| 26 | control |
| 28 | position reporting sensor |
| 30 | transceiver |
| 32 | lightning protection |
| 34 | power supply |
| 36 | network interface |
| 38 | data network |
| 40 | device |

Where in the foregoing description reference has been made to ratios, integers, components or modules having known equivalents then such equivalents are herein incorporated as if individually set forth.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus, methods, and illustrative examples shown and described. Accordingly, departures may be made from such details without departure from the spirit or scope of applicant's general inventive concept. Further, it is to be appreciated that improvements and/or modifications may be made thereto without departing from the scope or spirit of the present invention as defined by the following claims.

I claim:

1. An antenna orientation sensor, for mounting upon an antenna arrangement, comprising:

a base configured for coupling to the antenna arrangement wherein the antenna orientation sensor contacts the antenna arrangement only via the base;

a pivoting support coupled to the base;

a magnetic sensor on the pivoting support;

an actuator operable to move the pivoting support through a calibration movement with respect to the base; and a position sensor sensing the position of the pivoting support within the calibration movement.

2. The antenna orientation sensor of claim 1, wherein the magnetic sensor is a three axis magnetic sensor.

3. The antenna orientation sensor of claim 1, wherein the position sensor is an optical sensor.

4. The antenna orientation sensor of claim 1, wherein the position sensor is a two axis accelerometer.

5. The antenna orientation sensor of claim 1, wherein the pivoting support is a printed circuit board.

6. The antenna orientation sensor of claim 5, wherein the printed circuit board further includes a microcontroller coupled to the magnetic sensor and the position sensor.

7. The antenna orientation sensor of claim 6, wherein an output of the microcontroller controls the actuator.

8. The antenna orientation sensor of claim 6, wherein the microcontroller is coupled to a transceiver; the transceiver in communication with a remote controller.

9. The antenna orientation sensor of claim 8, wherein the communication between the transceiver and the remote controller is via a communication network.

10. The antenna orientation sensor of claim 1, wherein the pivoting support is a printed circuit board; and the position sensor is a two axis accelerometer mounted upon the printed circuit board.

11. An antenna orientation sensor, for mounting upon an antenna arrangement, comprising:

a base configured for coupling to the antenna arrangement, wherein the antenna orientation sensor contacts the antenna arrangement only via the base;

a printed circuit board pivotally coupled to the base;

a three axis magnetic sensor and a two axis accelerometer on the printed circuit board;

a microcontroller on the printed circuit board receiving inputs from the three axis magnetic sensor and the two axis accelerometer;

an actuator operable to move the printed circuit board through a calibration movement with respect to the base; and a position sensor sensing the position of the printed circuit board within the calibration movement.

12. The antenna orientation sensor of claim 11, further including a global positioning circuit coupled to the microcontroller.

* * * * *